US012799903B2

(12) United States Patent
Ginter et al.

(10) Patent No.: US 12,799,903 B2
(45) Date of Patent: Nov. 17, 2026

(54) SYSTEMS AND METHODS FOR MONITORING AND CONTROLLING CRANKCASE COMBUSTIBLE GAS CONCENTRATIONS

(71) Applicant: Caterpillar Inc., Peoria, IL (US)

(72) Inventors: David M. Ginter, Peoria, IL (US); Benjamin William Hanks, East Peoria, IL (US); Jaswinder Singh, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 26 days.

(21) Appl. No.: 18/978,060

(22) Filed: Dec. 12, 2024

(65) Prior Publication Data

US 2026/0168450 A1 Jun. 18, 2026

(51) Int. Cl.
*F02D 41/00* (2006.01)
*F01M 13/02* (2006.01)
*F02M 25/06* (2016.01)

(52) U.S. Cl.
CPC ......... *F02D 41/0025* (2013.01); *F01M 13/02* (2013.01); *F02D 41/0002* (2013.01); *F02M 25/06* (2013.01)

(58) Field of Classification Search
CPC ............. F02D 41/0025; F02D 41/0002; F02D 2250/08; F01M 13/02; F01M 13/021; F01M 2013/0044; F01M 2013/0077; F01M 2013/0083; F01M 2013/026; F02M 25/06; F02M 35/10222
See application file for complete search history.

(56) References Cited

U.S. PATENT DOCUMENTS 6,575,022 B1 * 6/2003 Schneider .............. F01M 13/00 73/114.01
7,040,306 B2 * 5/2006 Moriyama ........... F01M 13/025 123/572
8,695,339 B2 * 4/2014 Spix ..................... F01M 13/028 123/574
9,010,285 B2 4/2015 Jaasma
(Continued)

FOREIGN PATENT DOCUMENTS

CN 114320529 B 4/2023
CN 115585033 B 5/2023
(Continued)

*Primary Examiner* — Grant Moubry
*Assistant Examiner* — James G Moubry

(57) ABSTRACT

An internal combustion engine system is described herein. The system uses a throttle valve at an inlet of a crankcase to control the flowrate of air into the crankcase. The air is used to purge one or more combustible fluids from the crankcase caused from blow-by past one or more piston rings. A purge controller receives measurements from various detectors to control the flowrate. A concentration detector may be used to detect a concentration of one or more combustible fluids within the crankcase. Pressure and temperature detectors may be used to provide a measurement of the pressure and temperature within the crankcase. The purge controller also uses a venturi valve to increase or decrease the pressure within the crankcase. Additionally, the purge controller can measure an amount of blow-by gases by closing the throttle valve and measuring the rate of increase of the pressure within the crankcase.

20 Claims, 3 Drawing Sheets

(56) References Cited

U.S. PATENT DOCUMENTS

| | | | | |
|---|---|---|---|---|
| 9,650,927 | B2 | 5/2017 | Subedi et al. | |
| 2007/0074708 | A1 * | 4/2007 | Amano | F02M 25/06 123/572 |
| 2013/0233276 | A1 * | 9/2013 | Pursifull | F02D 23/02 123/345 |
| 2013/0340732 | A1 * | 12/2013 | Pursifull | F02M 35/10229 123/572 |
| 2019/0107081 | A1 * | 4/2019 | Dudar | F02D 41/004 |

FOREIGN PATENT DOCUMENTS

| | | | |
|---|---|---|---|
| CN | 117432501 | A | 1/2024 |
| DE | 102022209670 | A1 | 7/2023 |
| WO | WO1994001663 | A1 | 1/1994 |

* cited by examiner

SYSTEMS AND METHODS FOR MONITORING AND CONTROLLING CRANKCASE COMBUSTIBLE GAS CONCENTRATIONS

TECHNICAL FIELD

The present disclosure relates generally to operating a prime mover, and more particularly, to managing combustible gas concentrations within a crankcase of an engine.

BACKGROUND

Work machine prime movers, such as internal combustion engines, fuel cells, batteries, and the like, are widely used in various industries. Internal combustion engines, for example, can operate using a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. As part of the effort to improve the efficiency and emissions of these engines, researchers have explored various types of fuels, including natural gas and hydrogen. The use of some of these alternate fuels, either alone or in a mixture with other fuels, can present issues relating to the use of those fuels. As the engine is used, over time, wear and tear of components caused by friction occurs. One of these components are the piston rings that create a seal between the moving piston and the inside wall of the cylinder, sometimes referred to as "piston rings," though additional components may be used to provide a seal. As the piston rings wear down, during the combustion cycle of the particular piston, hot and pressurized gases present during combustion may "blow-by," or escape from the combustion space of the cylinder and into the crankcase of the engine.

If such blow-by gases include uncombusted gases such as hydrogen, these gases can collect in the crankcase. This may result in a combustible mixture that, if ignition conditions are present, may result in the combustion of those gases in the crankcase and potentially causing damage. Some efforts have been made to reduce the probability of combustion occurring in a crankcase due to blow-by gases. For example, German Patent Application No. DE102022209670 to Alfred et al. ("the '670 application") describes a system for venting a crankcase. The engine of the '670 application includes a crankcase ventilation device that is designed to flush the crankcase when a predefined moisture in the crankcase is exceeded. However, the system of the '670 application can be limited in its use. For example, because the concentration of gases such as hydrogen in the crankcase can depend heavily on the amount of the air entering the crankcase, the amount of blow-by occurring in one or more pistons may be hidden by constant air flow through the crankcase. Additionally, the "on-off" nature of the purge air entering the crankcase of the '670 application can pull more air than required into the crankcase, potentially unnecessarily increasing the use of air filters and oil separators, decreasing the viability of those and other components over time.

Examples of the present disclosure are directed to overcoming deficiencies of such systems.

SUMMARY

In an aspect of the present disclosure, a method of operating an internal combustion engine, the method comprising receiving first information indicating a concentration of a blow-by gas within a crankcase of the internal combustion engine, determining that the concentration is greater than a high concentration setpoint; and based on determining that the concentration is greater than the high concentration setpoint, increasing an opening of a throttle valve fluidly connected to an intake of the crankcase, wherein increasing the opening increases a flow of air into the crankcase.

In another aspect of the present disclosure, a purge controller configured to manage an internal combustion engine includes a memory storing computer-executable instructions, and a processor in communication with the memory, the computer-executable instructions causing the processor to perform acts comprising receiving first information indicating a concentration of a blow-by gas within a crankcase of the internal combustion engine, determining if the concentration is at or above a high concentration setpoint, requiring an increase of a purge of the gas from the crankcase of the internal combustion engine, and upon determining that the concentration is at or above the high concentration setpoint, increase an opening of a throttle valve on an intake of the crankcase to increase a flow of air into the crankcase.

In an additional aspect of the present disclosure, a combustion engine system includes an internal combustion engine having a combustion cylinder configured to combust a fuel and a crankcase configured to store at least a portion of lubricating oil to lubricate one or more components of the internal combustion engine, a throttle valve at an inlet of the crankcase, the throttle valve configured to receive air for purging the crankcase and to direct the air to into the inlet of the crankcase, a venturi valve at an outlet of the crankcase, the venturi valve configured to receive a high pressure fluid through the venturi valve to create at least a partial vacuum at the outlet of the crankcase, a concentration detector for detecting a concentration of a combustible gas within the crankcase; and a purge controller configured to manage an internal combustion engine, the purge controller comprising a memory storing computer-executable instructions; and a processor in communication with the memory, the computer-executable instructions causing the processor to perform acts comprising receiving first information from the concentration detector indicating a concentration of the combustible gas from the concentration detector, determining if the concentration is at or above a high concentration setpoint, requiring an increase of a purge of the combustible gas from the crankcase of the internal combustion engine, and upon determining that the concentration is at or above the high concentration setpoint, increase an opening of a throttle valve on an intake of the crankcase to increase a flow of air into the crankcase.

DETAILED DESCRIPTION

Figure 1:
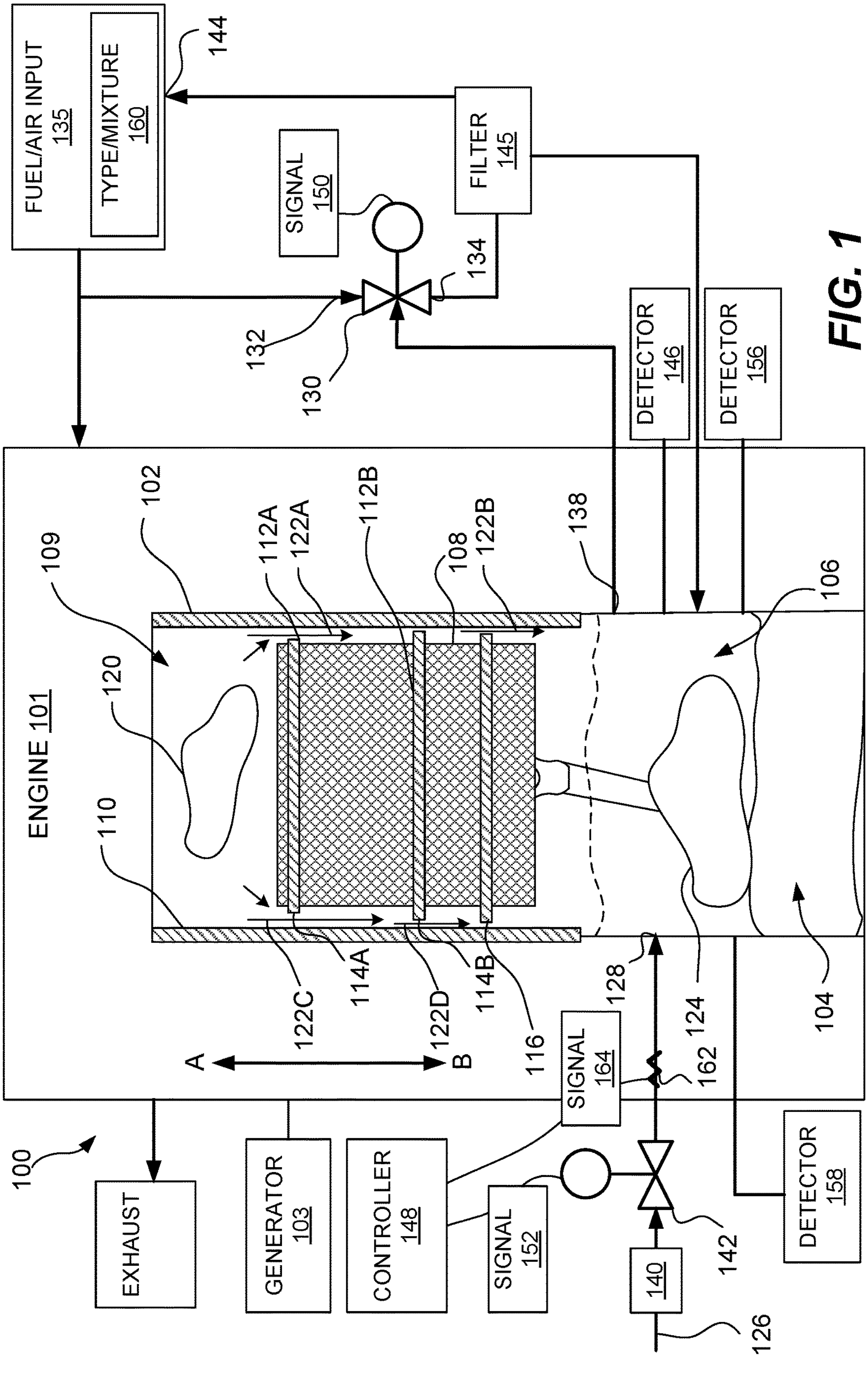
FIG. 1 is a cross-sectional view of a combustion cylinder and crankcase, showing the use of a purge system to monitor and control the concentration of combustible gases in a crankcase of an engine, in accordance with one or more examples of the present disclosure.

Wherever possible, the same reference numbers will be used throughout the drawings to refer to same or like parts. Referring to FIG. 1, there is shown a cross-sectional view 100 of an engine 101 and a portion of a combustion cylinder 102 that uses purge air to reduce a concentration of combustible gases in a crankcase of the engine 101, in accordance with one or more examples of the present disclosure. In some examples, the engine 101 can by a type that includes, but is not limited, to a natural gas engine that uses natural gas as a fuel, a hydrogen engine that uses hydrogen as a fuel, a diesel fuel engine that uses diesel as a fuel, a gasoline fuel engine that uses gasoline as a fuel, or engines that use methanol, Dimethyl ether (DME), ethanol, or various combinations thereof as fuels. The present disclosure is not limited to any particular type or use of an engine. In some examples, the engine 101 may be used to power additional equipment such as a generator 103 to provide electrical energy to various loads. It should be understood, however, that the engine 101 may be used to power other devices or machines such as, but not limited to, drivetrains for vehicles and work machines. Lubricant oil 104 located in a crankcase 106 of the engine 101 is used to lubricate various parts of the engine 101. The crankcase 106 is a volume of space within the engine 101 that is used to collect the lubricant oil 104 so that the lubricant oil 104 may be used within the engine 101.

Within the combustion cylinder 102, there is a piston 108 that moves during various cycles of the engine 101 (not shown). For example, in a four-stroke engine, the combustion cylinder 102 may move along axis AB towards A during the compression and exhaust cycles and towards B during the intake and combustion cycles. To maintain compression within a cylinder volume 109 during the compression cycle and to utilize the expansion of gases during the combustion cycle, the piston 108 is movably sealed against an inner cylinder wall 110 of the combustion cylinder 102 using compression rings 112A and 112B. The compression rings 112A and 112B each include an outer surface 114A and 114B, respectfully, that are compressed against the inner cylinder wall 110, forming a fluidic seal. As the compression rings 112A and 112B move along the inner cylinder wall 110, heat from friction is generated. To remove the heat and to lubricate the interface between the compression rings 112A and 112B and the inner cylinder wall 110, the lubricant oil 104 is used. The lubricant oil 104 is moved up the inner cylinder wall 110 along the axis AB towards A by the movement of the piston 108. It should be noted that the movement of the lubricant oil 104 is merely an example, as other methods of lubricating the inner cylinder wall 110 and other components of the combustion cylinder 102 may be used and are considered to be within the scope of the present disclosure. In some examples, to remove a portion of the lubricant oil 104 from the inner cylinder wall 110 as the piston 108 moves along the axis AB towards B, the piston 108 may further include an oil scraper 116.

During the use of the combustion cylinder 102, various surfaces may experience wear due to the movement of those surfaces against other surfaces. For example, the movement of the compression rings 112A and 112B along the inner cylinder wall 110 may result in one or more gaps or spaces between the compression rings 112A,112B and the inner cylinder wall 110. Along with potentially reducing the compression of the gases within the cylinder volume 109 during the compression and combustion cycles, such gaps may allow gases in the cylinder volume 109 to move out of the cylinder volume 109 and into the crankcase 106. For example, gases 120 may move into the crankcase 106 through gaps 122A, 122B, 122C, and/or 122D, referred to hereinafter as "blow-by gases 124." To reduce the accumulation of potentially combustible blow-by gases 124 in the crankcase 106, at least a portion of the blow-by gases 124 are purged. It should be understood that the blow-by gases 124 may enter the crankcase 106 resulting from various conditions of the engine, such as damage or degradation of the inner cylinder wall 110, the piston, and the like, and are not just limited to gases entering the crankcase 106 through the gaps.

To purge at least a portion of the blow-by gases 124, air 126 is introduced into the crankcase 106 via crankcase inlet 128. It should be noted that there may be one or more inlets 128 depending on the size, position, or shape of the crankcase 106. For example, inlets 128 may be located at or near areas of the crankcase 106 that are not positioned to receive the air 126, such as corners within the crankcase 106. To pull the air 126 into the crankcase 106, vacuum venturi valve 130 is provided. The vacuum venturi valve 130 receives high pressure fluid at a venturi inlet 132 and outputs lower pressure fluid at a venturi outlet 134. In some examples, the high-pressure fluid at the venturi inlet 132 may be received from various sources, including a fuel/air input 135 that provides fuel/air to the engine 101 for combustion. As the high-pressure fluid moves through the vacuum venturi valve 130, the internal shape of the vacuum venturi valve 130 provides a pressure drop across the vacuum venturi valve 130, resulting in the lower pressure fluid at a vacuum venturi outlet 134.

The pressure drop across the vacuum venturi valve 130 creates a partial vacuum at a crankcase output 138. The partial vacuum at the crankcase output 138 creates a partial vacuum within the crankcase 106. This partial vacuum created by the vacuum venturi valve 130 pulls the air 126 through an air filter 140, through a throttle valve 142 (if at least partially open) to direct the air 126 into the inlet 128 of the crankcase 106. The moving air 126 entering the crankcase 106 mixes with the blow-by gases 124, reducing the concentration of combustible gases within the crankcase 106. A portion of the mixture of the air 126 and the blow-by gases 124 is pulled into the vacuum venturi valve 130, where the mixture is mixed with high pressure fluid entering the vacuum venturi valve 130 and returned to the fuel/air input 135 via a fuel/air return 144. It should be noted that the use of the vacuum venturi valve 130 is merely an example of how the air 126 may be pulled/pushed into the crankcase 106. For example, a vacuum pump on the crankcase output 138 or a compressor on the crankcase inlet 128 may provide the fluidic force that moves the air 126 into the crankcase 106. In some examples, because the air 126 and the blow-by gases 124 moving through the crankcase 106 may entrain the lubricant oil 104 within the mixture, a filter 145 may be used. The filter 145 may separate the lubricant oil 104 from the gas mixture, allowing the gas mixture to be returned to the fuel/air input 135 and the separated lubricant oil 104 to be returned to the crankcase 106.

In some examples, the operation of the vacuum venturi valve 130 and/or the throttle valve 142 may be controlled by purge controller 148. In some examples, the purge controller 148 is a component, module, or function of an engine control unit (ECU) or is a component, module, or function that is controlled by or receives input from the ECU. The purge controller 148 is used to control the purging of the blow-by gases 124 (e.g., the amount of the air 126 introduced into the crankcase 106). In some examples, the purge controller 148 is used to maintain a concentration of combustible gases in the crankcase 106 below a concentration required for combustion. The purge controller 148 accomplishes this by controlling the operation of the vacuum venturi valve 130 by using venturi signal 150 and/or the throttle valve 142 using throttle signal 152 to increase, decrease, or eliminate the flow of the air 126 into the crankcase. For example, if a concentration detector 146 may provide information that indicates a concentration of a gas in the crankcase 106. The information provided by the concentration detector 146 may be used to indicate that a combustible gas, such as hydrogen, has a concentration in the crankcase 106 that is approaching, at, or over an upper concentration setpoint. In response to the information provided by the concentration detector 146, the purge controller 148 may issue the throttle signal 152 to either open or increase the opening of the throttle valve 142 to allow more air 126 to enter the crankcase 106.

To increase the vacuum within the crankcase 106, thus increasing the flowrate of the air 126, the purge controller 148 may issue the venturi signal 150 to more fully open the vacuum venturi valve 130. In some further examples, the purge controller 148 may maintain the vacuum venturi valve 130 in a set position and control the flowrate of the air 126 entering the crankcase 106 using the throttle valve 142. Upon receiving information (or a signal) from the concentration detector 146 that the concentration of combustible gases within the crankcase 106 is at or below a lower setpoint, the purge controller 148 may issue the throttle signal 152 to reduce the opening of the throttle valve 142 to reduce the flow of the air 126 into the crankcase 106. In some examples, the purge controller 148 may also issue the venturi signal 150 to reduce the opening of the vacuum venturi valve 130 to maintain the pressure/vacuum within the crankcase 106 to within an upper and lower setpoint. Thus, in some examples, the purge controller 148 uses the throttle valve 142 to adjust the flowrate of the air 126 entering the crankcase 106 and the position of the opening of the vacuum venturi valve 130 to maintain a desired pressure/vacuum within the crankcase 106.

In some examples, the purge controller 148 may close the throttle valve 142 and the vacuum venturi valve 130 for various reasons. For example, it may be desirable to periodically check the amount of blow-by occurring. Thus, in these examples, the purge controller 148 may issue the throttle signal 152 to close the throttle valve 142. A pressure detector 156 may be used for a blow-by gas flowrate measurement check by providing information that indicates pressure (and thereby a change in pressure) within the crankcase 106 caused by the introduction of the blow-by gases 124 into the crankcase 106. The purge controller 148 may use the pressure information (or readings) to calculate a change (rise) in pressure from an initial low pressure setpoint to a final high pressure setpoint indicating a flowrate of the blow-by gases 124 into the crankcase 106. The time it takes for the pressure in the crankcase 106 to rise from the low pressure setpoint to the high pressure setpoint may be used by the purge controller 148 to determine a flowrate of the blow-by gases 124 into the crankcase 106.

Once the blow-by gas flowrate measurement check is completed by the purge controller 148, the purge controller 148 may return to normal operation, whereby the concentration measurements provided by the concentration detector 146 are used by the purge controller 148 to change the positions of the throttle valve 142 and/or the vacuum venturi valve 130. It should be noted that in some examples, the purge controller 148 may use the pressure measurements provided by the pressure detector 156 to also control the operation of the throttle valve 142 and/or the vacuum venturi valve 130. For example, the pressure detector 156 may indicate a high pressure, thus causing the purge controller 148 to issue the venturi signal 150 to increase the opening of the vacuum venturi valve 130 to increase a negative pressure applied to the crankcase 106. Similarly, the pressure detector 156 may indicate a low pressure, thus causing the purge controller 148 to issue the venturi signal 150 to close more the vacuum venturi valve 130 to decrease a negative pressure applied to the crankcase 106.

In some examples, the purge controller 148 may use information provided by a temperature detector 158 that indicates a temperature within the crankcase 106. As noted above, a purpose of using the air 126 to purge at least a portion of the blow-by gases 124 within the crankcase 106 is to reduce the concentration of combustible gases, thus reducing the probability of ignition of those blow-by gases 124 in the crankcase 106. However, the concentration of the combustible gases needed for combustion may vary depending on the temperature within the crankcase 106. A relatively high temperature within the crankcase 106 may increase the probability of ignition, thus requiring a lower concentration of combustible gases. Similarly, a relatively low temperature within the crankcase 106 may decrease the probability of ignition, thus allowing for a high concentration of combustible gases. In these examples, the purge controller 148 may increase the flowrate of the air 126 to decrease not only the concentration of combustible gases, but also, to decrease the temperature within the crankcase 106 as detected by the temperature detector 158.

If the temperature is at or above a high temperature setpoint, the purge controller 148 may issue the throttle signal 152 to increase the flowrate of the air 126 into the crankcase 106, thus potentially reducing the temperature within the crankcase 106. Upon receiving a temperature signal from the temperature detector 158 that the temperature within the crankcase 106 is at or below a low temperature setpoint, the purge controller 148 may issue the throttle signal 152 to reduce the flowrate of the air 126. In some examples, the purge controller 148 uses the concentration signals from the concentration detector 146 and/or the pressure signals from the pressure detector 156 to determine default/normal positions of the throttle valve 142 and the vacuum venturi valve 130, and uses the temperature signals from the temperature detector 158 to change the default/normal positions of the throttle valve 142 and the vacuum venturi valve 130 until the temperature is within the upper and lower temperature setpoints. Once the temperature is within the upper and lower temperature setpoints, the purge controller 148 reverts back to the default/normal positions of the throttle valve 142 and the vacuum venturi valve 130. In some examples, the low temperature setpoint may be based on a condensation temperature of water, whereby the temperature is maintained above the condensation temperature to reduce the probability of water condensing within the crankcase 106. In some examples, a heater 162 may be provided to increase a temperature of the incoming air 126 entering the crankcase. In these examples, the controller 148 may issue a heater control signal 164 that energizes (turns on or increases the heat output of) the heater 162 or deenergizes (turns off or decreases the heat output of) the heater 162.

In some examples, the engine 101 may use different types of fuel that may result in the modification of the operation of the purge controller 148. For example, the fuel/air input 135 may be switched from using hydrogen to only natural gas. Although natural gas is still combustible, the potential of natural gas collecting in the crankcase 106 in the blow-by gas 124 may be lower than hydrogen. Thus, the purge controller 148 may reduce the purge operation by closing more the throttle valve 142 than what would be required if hydrogen is the fuel. In some examples, the fuel/air input 135 may be comprised of fuel such as diesel fuel. In this example, purging of the crankcase 106 may not be required. In these and other scenarios, including combinations of one or more fuels, the purge controller 148 may receive a type/mixture signal 160 that indicates which fuel or fuels are being used in the fuel/air input 135. The purge controller 148 receives the type/mixture signal 160 and adjusts the operation of the purge controller 148 based on the type/mixture signal 160. Examples of the various manners in which the purge controller 148 operations are illustrated in FIG. 2, below.

Figure 2:
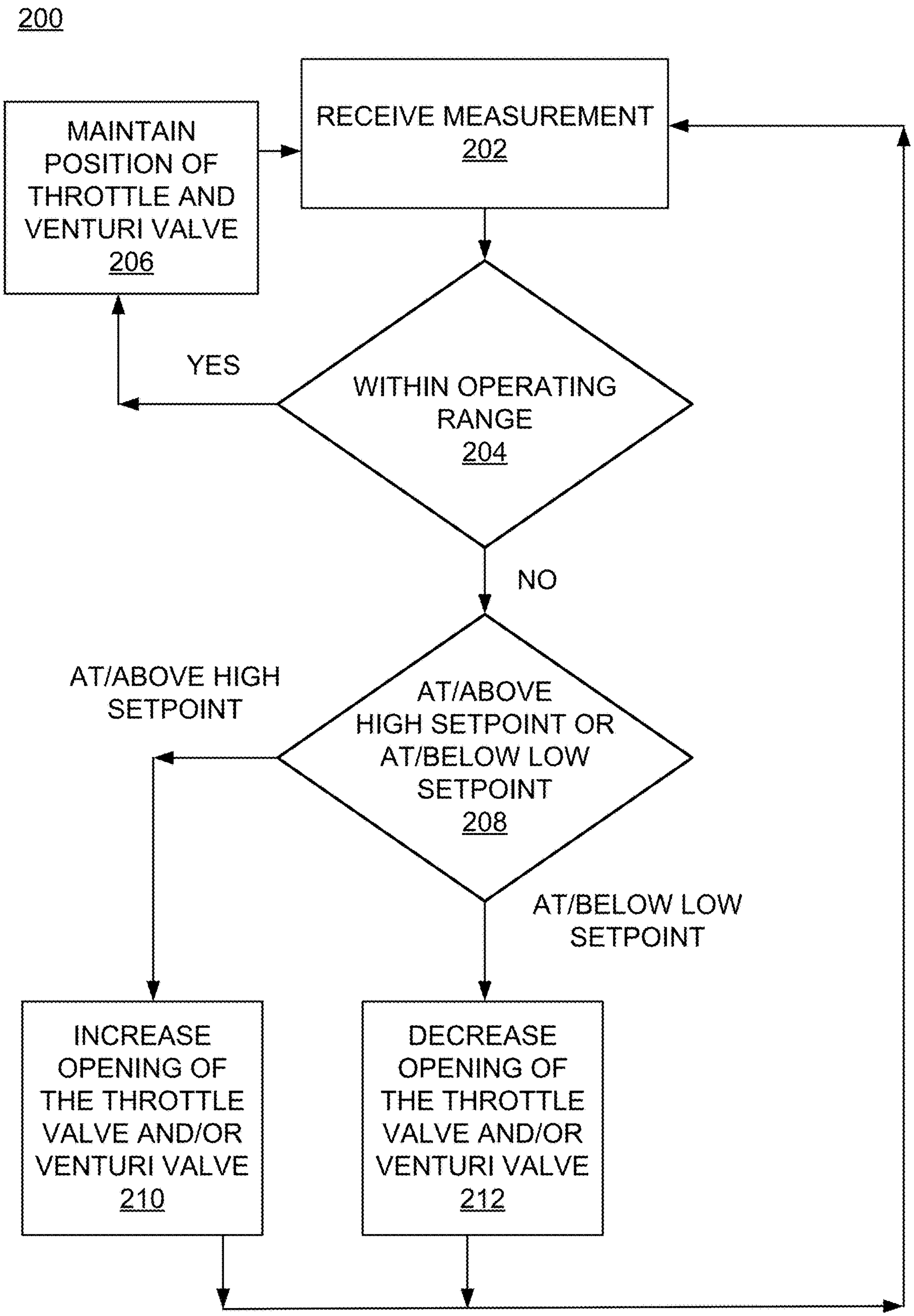
FIG. 2 illustrates a method for using purge system to monitor and control the concentration of combustible gases in a crankcase of an engine, in accordance with various examples of the presently disclosed subject matter.

FIG. 2 illustrates a method 200 of using a purge system to monitor and control the concentration of combustible gases in a crankcase of an engine, in accordance with various examples of the presently disclosed subject matter. The method 200 and other processes described herein are illustrated as example flow graphs, each operation of which may represent a sequence of operations that can be implemented by equipment, modules, hardware, software, or combinations thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The method 200 can be implemented or controlled by a controller, such as the purge controller 148 of FIG. 1. The purge controller 148 may be comprised of hardware, software, or various combinations thereof, described by way of example in FIG. 3.

The method 200 commences at step 202, where the purge controller 148 is receives measurements of conditions within the crankcase from one or more detectors. In one example, the detector can include the concentration detector 146 that measures the concentration of one or more gaseous components of the blow-by gases 124. In some examples, the gaseous components of interest are combustible gases, such as hydrogen. In another example, the detector can include the pressure detector 156 that provides a measurement of the pressure within the crankcase 106. In another example, the detector may include the temperature detector 158 that provides a measurement of the temperature within the crankcase 106. In some examples, the purge controller 148 may use one or more of the detectors.

At step 204, the purge controller 148 determines if a measurement, such as pressure, temperature, and concentration, is within an operating range. Some examples of operational ranges may include but are not limited to: a concentration of 20 percent of a lower flammability limit up to 50 percent of a lower flammability limit of one or more flammable gases in the crankcase 106; a pressure of 3 kpa to −3 kpa in the crankcase 106; and a temperature of 120 degrees Celsius to 0 degrees Celsius of the lubricant. If at step 204 the purge controller 148 determines that the measurements are within an operating range, the method 200 continues to step 206, whereby the positions of the throttle and venturi valves are maintained. The method 200 thereafter continues from step 206 to step 202, where the purge controller 148 continues to receive measurements. It should be noted that although the method 200 may continue at various steps, in some examples, the purge controller 148 continually receives measurements.

If at step 204, the purge controller 148 determines that a measurement is not within an operating range, the method continues to step 208, wherein the purge controller 148 determines if the measurement is at or above (or greater than) a high setpoint or at or below a low setpoint. If at step 208 the purge controller 148 determines that the measurement is at or above a high setpoint, at step 210 the purge controller 148 issues the throttle signal 152 to increase the opening of the throttle valve 142 to increase a flowrate of the air into the crankcase 106 and/or issue the venturi signal 150 to increase the opening of the vacuum venturi valve 130 to decrease the pressure in the crankcase 106. The method 200 continues to step 202, wherein the purge controller 148 continues to receive measurements from the detectors. In some examples, the method 200 continues until the controller receives information from one or more of the detectors that the information provided by the one or more detectors is within an operating range at step 204.

In some further examples, at step 208, the purge controller 148 may issue one or more alarms to provide information to a user or other entity, such as a monitoring center that monitors the engine 101. For example, if at step 208 the purge controller 148 determines that the concentration of hydrogen in the crankcase 106 is at or above 20% of the lower flammability limit of hydrogen, the purge controller 148 can issue a control signal to cause a warning sound and/or light to notify a user that the concentration of hydrogen is increasing and may be approaching an upper limit of 50% of the lower flammability limit. In a similar manner, if at step 208 the purge controller 148 determines that the pressure within the crankcase is 2.5 kpa (close to the upper setpoint), the purge controller 148 can issue a control signal to cause a warning sound and/or light to notify a user that the pressure is increasing towards the upper pressure limit.

If at step 208 the purge controller 148 determines that a measurement is at or below a low setpoint, the method continues to step 212, whereby the purge controller 148 issues the throttle signal 152 to decrease the opening of the throttle valve 142 to decrease a flowrate of the air into the crankcase 106 and/or issue the venturi signal 150 to decrease the opening of the vacuum venturi valve 130 to increase the pressure in the crankcase 106. The method 200 continues to step 202, wherein the purge controller 148 continues to receive information from the detectors. In some examples, the method 200 continues until the controller receives information from one or more of the detectors that the information provided by the one or more detectors is within an operating range at step 204.

As noted above, the flowrates of the throttle valve 142 and/or the vacuum venturi valve 130 may be adjusted to change conditions within the crankcase 106. There may be several ways in which the flowrate is adjusted. For example, the flowrate(s) may be adjusted by opening or closing the throttle valve 142 and/or the vacuum venturi valve 130 by opening or closing the throttle valve 142 and/or the vacuum venturi valve 130 by an incremental change and then continuing the method 200 until at step 204, the information received from the one or more detectors is within an operating range. Other methods of determining a flowrate change may be used and are considered to be within the scope of the presently disclosed subject matter.

Figure 3:
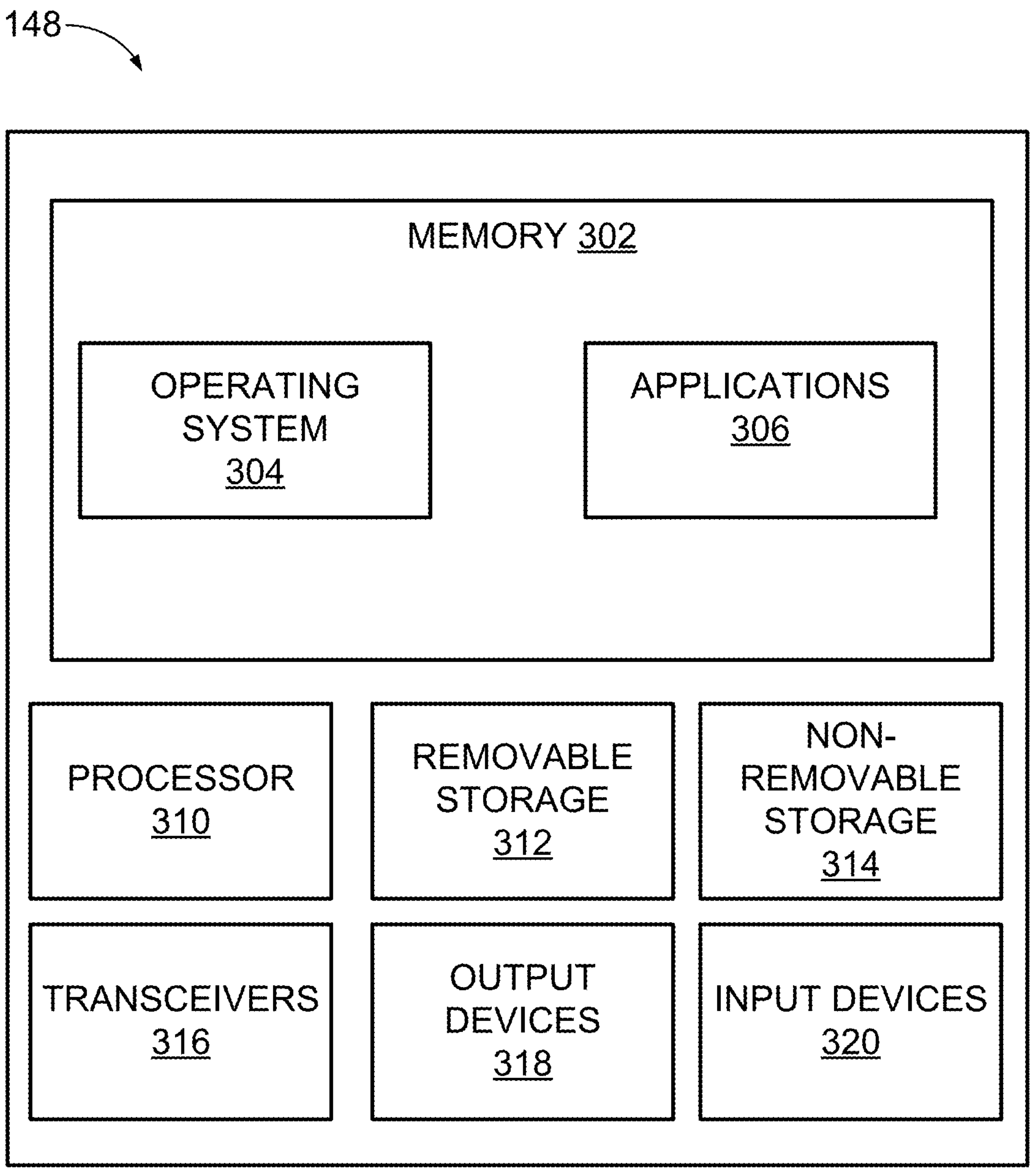
FIG. 3 depicts a component level view of a controller for use with the systems and methods described herein, in accordance with various examples of the presently disclosed subject matter.

FIG. 3 depicts a component level view of the purge controller 148 for use with the systems and methods described herein, in accordance with various examples of the presently disclosed subject matter. The purge controller 148 could be any device capable of providing the functionality associated with the systems and methods described herein. The purge controller 148 can comprise several components to execute the above-mentioned functions. The purge controller 148 may be comprised of hardware, software, or various combinations thereof. As discussed below, the purge controller 148 can comprise memory 302 including an operating system (OS) 304 and one or more applications 306. The applications 306 may include applications that provide for venturi signal 150 and the throttle signal 152, as well as implement one or more steps of the method 200 described above.

The purge controller 148 can also comprise one or more processors 310 and one or more of removable storage 312, non-removable storage 314, transceiver(s) 316, output device(s) 318, and input device(s) 320. In various implementations, the memory 302 can be volatile (such as random-access memory (RAM)), non-volatile (such as read only memory (ROM), flash memory, etc.), or some combination of the two.

The memory 302 can also include the OS 304. The OS 304 varies depending on the manufacturer of the purge controller 148. The OS 304 contains the modules and software that support basic functions of the purge controller 148, such as scheduling tasks, executing applications, and controlling peripherals and valves. The OS 304 can also enable the purge controller 148 to send and retrieve other data and perform other functions.

In some implementations, the processor(s) 310 can be one or more central processing units (CPUs), graphics processing units (GPUs), both CPU and GPU, or any other combinations and numbers of processing units. The purge controller 148 may also include additional data storage devices (removable and/or non-removable) such as, for example, magnetic disks, optical disks, or tape. Such additional storage is illustrated in FIG. 3 by removable storage 312 and non-removable storage 314.

Non-transitory computer-readable media may include volatile and nonvolatile, removable and non-removable tangible, physical media implemented in technology for storage of information, such as computer readable instructions, data structures, program modules, or other data. The memory 302, removable storage 312, and non-removable storage 314 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the purge controller 148. Any such non-transitory computer-readable media may be part of the purge controller 148 or may be a separate database, databank, remote server, or cloud-based server.

In some implementations, the transceiver(s) 316 include any transceivers known in the art. In some examples, the transceiver(s) 316 can include wireless modem(s) to facilitate wireless connectivity with other components (e.g., between the purge controller 148 and one or more pumps or valves), the Internet, and/or an intranet. Specifically, the transceiver(s) 316 can include one or more transceivers that can enable the purge controller 148 to send and receive data. Thus, the transceiver(s) 316 can include multiple single-channel transceivers or a multi-frequency, multi-channel transceiver to enable the purge controller 148 to send and receive video calls, audio calls, messaging, etc. The transceiver(s) 316 can enable the purge controller 148 to connect to multiple networks including, but not limited to 2G, 3G, 4G, 5G, and Wi-Fi networks. The transceiver(s) 316 can also include one or more transceivers to enable the purge controller 148 to connect to future (e.g., 6G) networks, Internet-of-Things (IoT), machine-to machine (M2M), and other current and future networks. The transceivers 316 may also include wired connections to facilitate wired communications with one or more components.

The transceiver(s) 316 may also include one or more radio transceivers that perform the function of transmitting and receiving radio frequency communications via an antenna (e.g., Wi-Fi or Bluetooth®). In other examples, the transceiver(s) 316 may include wired communication components, such as a wired modem or Ethernet port, for communicating via one or more wired networks. The transceiver(s) 316 can enable the purge controller 148 to facilitate audio and video calls, download files, access web applications, and provide other communications associated with the systems and methods, described above.

In some implementations, the output device(s) 318 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 318 can also include speakers, or similar devices, to play sounds or ringtones when an audio call or video call is received. Output device(s) 318 can also include ports for one or more peripheral devices, such as headphones, peripheral speakers, or a peripheral display.

In various implementations, input device(s) 320 include any input devices known in the art. For example, the input device(s) 320 may include a camera, a microphone, or a keyboard/keypad. The input device(s) 320 can include a touch-sensitive display or a keyboard to enable users to enter data and make requests and receive responses via web applications (e.g., in a web browser), make audio and video calls, and use the standard applications 306, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 320 and an output device 318.

INDUSTRIAL APPLICABILITY

The present disclosure relates generally to internal combustion engines that use a purge system to reduce or eliminate combustible gases within a crankcase 106 of an engine 101. As mentioned above, as a piston of the engine moves within the combustion cylinder, the sealing surfaces provided by sealing devices such as piston rings can degrade due to the friction between the piston rings and the inner walls of the combustion cylinder. The degradation can allow for the movement of combustible gases in the combustion space of the combustion cylinder 102 into the crankcase 106. If ignition conditions are met within the crankcase 106, i.e., the concentration of combustible gases is high enough and a source of heat is provided, the combustible gases within the crankcase 106 may ignite. This may damage components of the engine 101 and may present a safety hazard.

To reduce the probability of ignition within the crankcase 106, the present disclosure uses air 126 to reduce the concentration of combustible gases. The position of the opening of the throttle valve 142 is used to control the flowrate of the air 126 into the crankcase 106. The position of the opening of the throttle valve 142 can also be used to cease purging by closing the throttle valve to stop the flow of air into the crankcase 106. This may be useful when the engine 101 is used for various types of fuels that may not need purging. For example, if the engine 101 uses diesel fuel, purging may not be needed. However, if the fuel of the engine 101 is converted to a fuel such as hydrogen (or mixtures of hydrogen), the purge system may need to be brought back online (or in operation). Therefore, the throttle valve 142 may be opened to provide for purging of the blow-by gases 124. Additionally, the throttle valve 142 may be used to test a system. For example, the throttle valve 142 may be closed to eliminate the introduction of the air 126 into the crankcase 106. The pressure detector 156 can provide pressure measurements of the crankcase 106 to the purge controller 148. The purge controller 148 can maintain the position of the opening of the throttle valve 142 closed for a period of time, measuring the increase in pressure of the crankcase 106 over that time. The purge controller 148 uses the increase in pressure to determine the flowrate of the blow-by gases 124 into the crankcase 106. This flowrate can be used to determine if maintenance is required or may be required in the future. For example, a high flowrate may indicate that one or more piston rings are no longer effective in maintaining combustible gases within the combustion space of the combustion cylinder. The vacuum venturi valve 130 may be kept open during a test. Rather than measuring a pressure increase, with the venturi valve open, if no vacuum is pulled in the crankcase, this could also indicate a higher than desired flowrate of blow-by gases 124. Upon an end of the period of time used for the test, the purge controller 148 can cease the combustible gas flowrate measurement (i.e., the blow-by test) by opening the throttle valve to a position prior to the commencement of the test.

The use of one or more aspects of the presently disclosed subject matter may provide some advantages. For example, by controlling the purging of the crankcase 106 using the throttle valve 142, the amount of the air entering the crankcase 106 can be controlled, reducing the use of the filter 140, thereby extending the lifetime use of the filter 140. Additionally, by testing the system for the amount of blow-by occurring, potential issues may be identified prior to system failure and/or provide the user with information that may indicate that the engine is running at less-than optimal efficiency. Further, by being able to cease purging when various types of fuels are detected, the engine may be optimized when using one or more of those fuels by purging the crankcase only when purging is required or needed.

Additionally, the throttle valve 142 may be used to help regulate the pressure in the crankcase 106, potentially limiting the damage caused to components in an overpressure situation. As discussed above, some conventional systems use a venturi valve to assist with a purge operation. However, because the flowrate of the venturi valve may vary depending on engine conditions, i.e., power demand which may cause significant changes in the fuel pressure and/or air pressure applied to the venturi valve, these pressure fluctuations can cause pressure variances in the crankcase. These pressure variations can be significant enough to cause damage to engine components exposed to those pressure variations. As described above, in additional to changing the flowrate of purge air 126 entering the crankcase 106, the throttle valve 142 may also be used to moderate those pressure fluctuations caused by changing engine conditions. Further, the heater 162 may be used in situations in which the lubricant and/or the crankcase 106 may desirably be heated. Using the heater 162, including during a startup, may decrease the probability of the condensation of water vapor or contaminants in the crankcase. Further, heating the lubricant may allow the lubricant to flow more easily throughout the engine, potentially reducing damage or wear on engine components.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of operating an internal combustion engine, the method comprising:

receiving first information indicating a concentration of a blow-by gas within a crankcase of the internal combustion engine;

determining that the concentration is greater than a high concentration setpoint; and based on determining that the concentration is greater than the high concentration setpoint, increasing an opening of a throttle valve fluidly connected to an intake of the crankcase, wherein increasing the opening increases a flow of air into the crankcase.

2. The method of claim 1, wherein the blow-by gas comprises hydrogen used as a fuel for the internal combustion engine.

3. The method of claim 1, further comprising:

receiving second information indicating a pressure within the crankcase of the internal combustion engine;

determining if the pressure is at or above a high pressure setpoint, at or below a low pressure setpoint, or above the low pressure setpoint and below the high pressure setpoint; and upon determining that the pressure is:

at or above a high pressure setpoint, increasing an opening of a vacuum venturi valve to decrease the pressure in the crankcase;

at or below a low pressure setpoint, decreasing an opening of the vacuum venturi valve to increase the pressure in the crankcase; and above the low pressure setpoint and below the high pressure setpoint, maintaining a position of the opening of the vacuum venturi valve.

4. The method of claim 1, further comprising initiating a blow-by gas flowrate measurement by:

closing the throttle valve to stop the flow of air into the crankcase for a period of time;

receiving additional information indicating pressure readings of a pressure within the crankcase of the internal combustion engine;

determine a flowrate of the blow-by gas using an increase in the pressure within the crankcase of the internal combustion engine; and upon an end of the period of time, ceasing the blow-by gas flowrate measurement by opening the throttle valve to a prior position.

5. The method of claim 1, further comprising:

receiving additional information indicating a temperature within the crankcase of the internal combustion engine;

determining if the temperature is at or above a high temperature setpoint, at or below a low temperature setpoint, or above the low temperature setpoint and below the high temperature setpoint; and upon determining that the temperature is:

at or above a high temperature setpoint, increasing an opening of the throttle valve to increase a flowrate of air into the crankcase;

at or below a low temperature setpoint, decreasing an opening of the throttle valve to decrease the flowrate of air into the crankcase or energizing a heater to increase a temperature of the air flowing into the crankcase; and above the low temperature setpoint and below the high temperature setpoint, maintaining a position of the opening of the throttle valve.

6. The method of claim 1, further comprising:

receiving a fuel type signal indicating that a purge of the crankcase is not required; and closing the throttle valve to stop the flow of air into the crankcase.

7. The method of claim 1, wherein the blow-by gas enters the crankcase through a gap between a piston ring and an inner wall of a combustion cylinder of the internal combustion engine.

8. A purge controller configured to manage an internal combustion engine, the purge controller comprising:

a memory storing computer-executable instructions; and a processor in communication with the memory, the computer-executable instructions causing the processor to perform acts comprising:

receiving first information indicating a concentration of a blow-by gas within a crankcase of the internal combustion engine;

determining if the concentration is at or above a high concentration setpoint, requiring an increase of a purge of the blow-by gas from the crankcase of the internal combustion engine; and upon determining that the concentration is at or above the high concentration setpoint, increase an opening of a throttle valve on an intake of the crankcase to increase a flow of air into the crankcase.

9. The purge controller of claim 8, wherein the blow-by gas comprises hydrogen used as a fuel for the internal combustion engine.

10. The purge controller of claim 8, further comprising computer-executable instructions to cause the processor to perform acts comprising:

receiving second information indicating a pressure a pressure within the crankcase of the internal combustion engine;

determining if the pressure is at or above a high pressure setpoint, at or below a low pressure setpoint, or above the low pressure setpoint and below the high pressure setpoint; and upon determining that the pressure is:

at or above a high pressure setpoint, increasing an opening of a vacuum venturi valve to decrease the pressure in the crankcase;

at or below a low pressure setpoint, decreasing an opening of the vacuum venturi valve to increase the pressure in the crankcase; and above the low pressure setpoint and below the high pressure setpoint, maintaining a position of the opening of the vacuum venturi valve.

11. The purge controller of claim 10, further comprising computer-executable instructions to cause the processor to perform acts comprising initiating a blow-by gas flowrate measurement by:

closing the throttle valve to stop the flow of air into the crankcase for a period of time;

receiving the second information indicating the pressure within the crankcase of the internal combustion engine;

determine a flowrate of the blow-by gas using an increase in the pressure within the crankcase of the internal combustion engine; and upon an end of the period of time, ceasing the blow-by gas flowrate measurement by opening the throttle valve to a prior position.

12. The purge controller of claim 8, further comprising computer-executable instructions to cause the processor to perform acts comprising:

receiving additional information indicating a temperature within the crankcase of the internal combustion engine;

determining if the temperature is at or above a high temperature setpoint, at or below a low temperature setpoint, or above the low temperature setpoint and below the high temperature setpoint; and upon determining that the temperature is:

at or above a high temperature setpoint, increasing an opening of the throttle valve to increase a flowrate of air into the crankcase;

at or below a low temperature setpoint, decreasing an opening of the throttle valve to decrease the flowrate of air into the crankcase; and above the low temperature setpoint and below the high temperature setpoint, maintaining a position of the opening of the throttle valve.

13. The purge controller of claim 8, further comprising computer-executable instructions to cause the processor to perform acts comprising:

receiving a fuel type signal indicating that a purge of the crankcase is not required; and closing the throttle valve to stop the flow of air in the crankcase.

14. The purge controller of claim 8, wherein the blow-by gas enters the crankcase through a gap between a piston ring and an inner wall of a combustion cylinder of the internal combustion engine.

15. A combustion engine system, comprising:

an internal combustion engine having a combustion cylinder configured to combust a fuel and a crankcase configured to store at least a portion of lubricating oil to lubricate one or more components of the internal combustion engine;

a throttle valve at an inlet of the crankcase, the throttle valve configured to receive air for purging the crankcase and to direct the air to into the inlet of the crankcase;

a venturi valve at an outlet of the crankcase, the venturi valve configured to receive a high pressure fluid through the venturi valve to create at least a partial vacuum at the outlet of the crankcase;

a concentration detector for detecting a concentration of a combustible gas within the crankcase; and a purge controller configured to manage the internal combustion engine, the purge controller comprising:

a memory storing computer-executable instructions; and a processor in communication with the memory, the computer-executable instructions causing the processor to perform acts comprising:

receiving first information from the concentration detector indicating a concentration of the combustible gas from the concentration detector;

determining if the concentration is at or above a high concentration setpoint, requiring an increase of a purge of the combustible gas from the crankcase of the internal combustion engine; and upon determining that the concentration is at or above the high concentration setpoint, increase an opening of a throttle valve on an intake of the crankcase to increase a flow of air into the crankcase.

16. The combustion engine system of claim 15, wherein the combustible gas is hydrogen used as the fuel for the internal combustion engine.

17. The combustion engine system of claim 15, further comprising a pressure detector, wherein the purge controller further comprises computer-executable instructions to cause the processor to perform acts comprising:

receiving second information from the pressure detector indicating a pressure within the crankcase of the internal combustion engine;

determining if the pressure is at or above a high pressure setpoint, at or below a low pressure setpoint, or above the low pressure setpoint and below the high pressure setpoint; and upon determining that the pressure is:

at or above a high pressure setpoint, increasing an opening of a vacuum venturi valve to decrease the pressure in the crankcase;

at or below a low pressure setpoint, decreasing an opening of the vacuum venturi valve to increase the pressure in the crankcase; and above the low pressure setpoint and below the high pressure setpoint, maintaining a position of the opening of the vacuum venturi valve.

18. The combustion engine system of claim 17, wherein the purge controller further comprises computer-executable instructions to perform a combustible gas flowrate measurement by:

closing the throttle valve to stop the flow of air into the crankcase for a period of time;

receiving the second information from the pressure detector;

determine a flowrate of the combustible gas using an increase in the pressure within the crankcase of the internal combustion engine; and upon an end of the period of time, ceasing the combustible gas flowrate measurement by opening the throttle valve to a prior position.

19. The combustion engine system of claim 15, further comprising a temperature detector, wherein the purge controller further comprises computer-executable instructions to cause the processor to perform acts comprising:

receiving additional information from the temperature detecting indicating a temperature within the crankcase of the internal combustion engine;

determining if the temperature is at or above a high temperature setpoint, at or below a low temperature setpoint, or above the low temperature setpoint and below the high temperature setpoint; and upon determining that the temperature is:

at or above a high temperature setpoint, increasing an opening of the throttle valve to increase a flowrate of air into the crankcase;

at or below a low temperature setpoint, decreasing an opening of the throttle valve to decrease the flowrate of air into the crankcase; and above the low temperature setpoint and below the high temperature setpoint, maintaining a position of the opening of the throttle valve.

20. The combustion engine system of claim 15, wherein the purge controller further comprises computer-executable instructions to cause the processor to perform acts comprising:

receiving a fuel type signal indicating that a purge of the crankcase is not required; and closing the throttle valve to stop the flow of air in the crankcase.

* * * * *